United States Patent
McIntosh et al.

(10) Patent No.: US 6,863,082 B1
(45) Date of Patent: Mar. 8, 2005

(54) MOUNTING A FUEL VAPOR MANAGEMENT VALVE INTERNALLY TO A GAS TANK

(75) Inventors: Andrew W. McIntosh, Ann Arbor, MI (US); Kenneth M. Spink, Jerome, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/640,593

(22) Filed: Aug. 13, 2003

(51) Int. Cl.[7] .............................................. F16K 24/04

(52) U.S. Cl. .......................................... 137/202; 137/43

(58) Field of Search .................................. 137/43, 202

(56) References Cited

U.S. PATENT DOCUMENTS

| | | | | | |
|---|---|---|---|---|---|
| 5,277,217 | A | * | 1/1994 | Kobayashi et al. | 137/202 |
| 5,404,907 | A | * | 4/1995 | Benjey et al. | 137/202 |
| 6,286,539 | B1 | * | 9/2001 | Nishi et al. | 137/202 |
| 2004/0025937 | A1 | * | 2/2004 | Kojima | 137/202 |

* cited by examiner

Primary Examiner—Gerald A. Michalsky
(74) Attorney, Agent, or Firm—Roger A. Johnston (57) ABSTRACT

A plastic bodied fuel vapor management valve has mounting lugs thereon which are adjustably snap-locked onto a bracket provided on a cover for the tank access opening to selectively locate the valve vertically on the bracket. As the valve is engaged with the bracket, a vapor vent fitting provided on the cover is received in the valve outlet and sealed by a seal ring. The cover preferably comprises a mounting flange for a fuel level signal sender.

18 Claims, 9 Drawing Sheets

MOUNTING A FUEL VAPOR MANAGEMENT VALVE INTERNALLY TO A GAS TANK

BACKGROUND OF THE INVENTION

The present invention relates to mounting of fill vapor management valves in a gas tank and particularly relates to the mounting of such valves in a metal fuel tank. Such valves are typically float operated formed of plastic material and provide for a valve outlet which conducts fuel vapor out of the tank through a conduit to a storage device such as a canister filled with carbon particles. Heretofore, where such valves have been mounted internally in the tank, it has been necessary to attach the valve to a cover member for the access opening through which the valve is inserted in the tank. Known arrangements have provided for attachment of the vapor management valve to a metal cover, such as the fuel level signal sender mounting flange, with clips and fasteners. This arrangement has rendered it difficult to install the valve and calibrate the valve at the correct height within the tank and has required individual valve structures for tanks of different depth configuration.

Thus, it has been desired to provide a way or means of attaching a fuel vapor management valve internally in a gas tank in a manner which enables a single valve design to accommodate various fuel tank depths and in a simple, easy-to-install manner which does not require separate fasteners at assembly.

BRIEF SUMMARY OF THE INVENTION

The present invention provides a solution to the above-described problem of installing a fuel vapor management valve, particularly one of the type having a plastic body, in the interior of a metal fuel tank without the need for separate fasteners. The method of the present invention enables a single valve design to accommodate tanks of various depths and has provision for limited adjustment of the vertical position of the valve within the tank to permit variation in the fuel level at which the valve closes and prevents vapor from escaping from the tank.

The present invention employs a mounting structure in the form of a strap or bracket extending downwardly from the undersurface of the upper wall of the tank or from a cover for the access opening in the tank; and, provision is also made for a tubular vent conduit fitting to extend downwardly from the cover. In the preferred form, the cover comprises the flange of the fuel level signal sender mechanism which is installed in the tank through the access opening. A vapor management valve is provided with attachment lugs or projections on the body thereof which engage a tab and an aperture in the mounting structure on the cover for sliding snap action engagement. A plurality of apertures are provided in the mounting structure or bracket to permit engagement of a snap-locking lug on the valve at a pre-selected vertical position on the bracket. A seal ring provided in the vapor outlet of the valve slidably engages the tubular fitting extending downwardly from the cover to provide a sealed connection to the fitting for communicating fuel vapor from the valve to the exterior of the tank through the cover or sender module flange.

The seal ring is secured in place by a retaining ring snapped into the body. The ring may be varied in axial length to serve as a spacer for maintaining the valve in the desired position on the mounting structure.

The present invention thus provides a simple and effective, yet relatively low-cost way of attaching a fuel vapor management valve to an access opening cover for a fuel tank in a manner to selectively position the valve within the tank and to accommodate various different depths of fuel tank without requiring a change in the design of the vapor management valve.

DETAILED DESCRIPTION OF THE INVENTION

Figure 1:
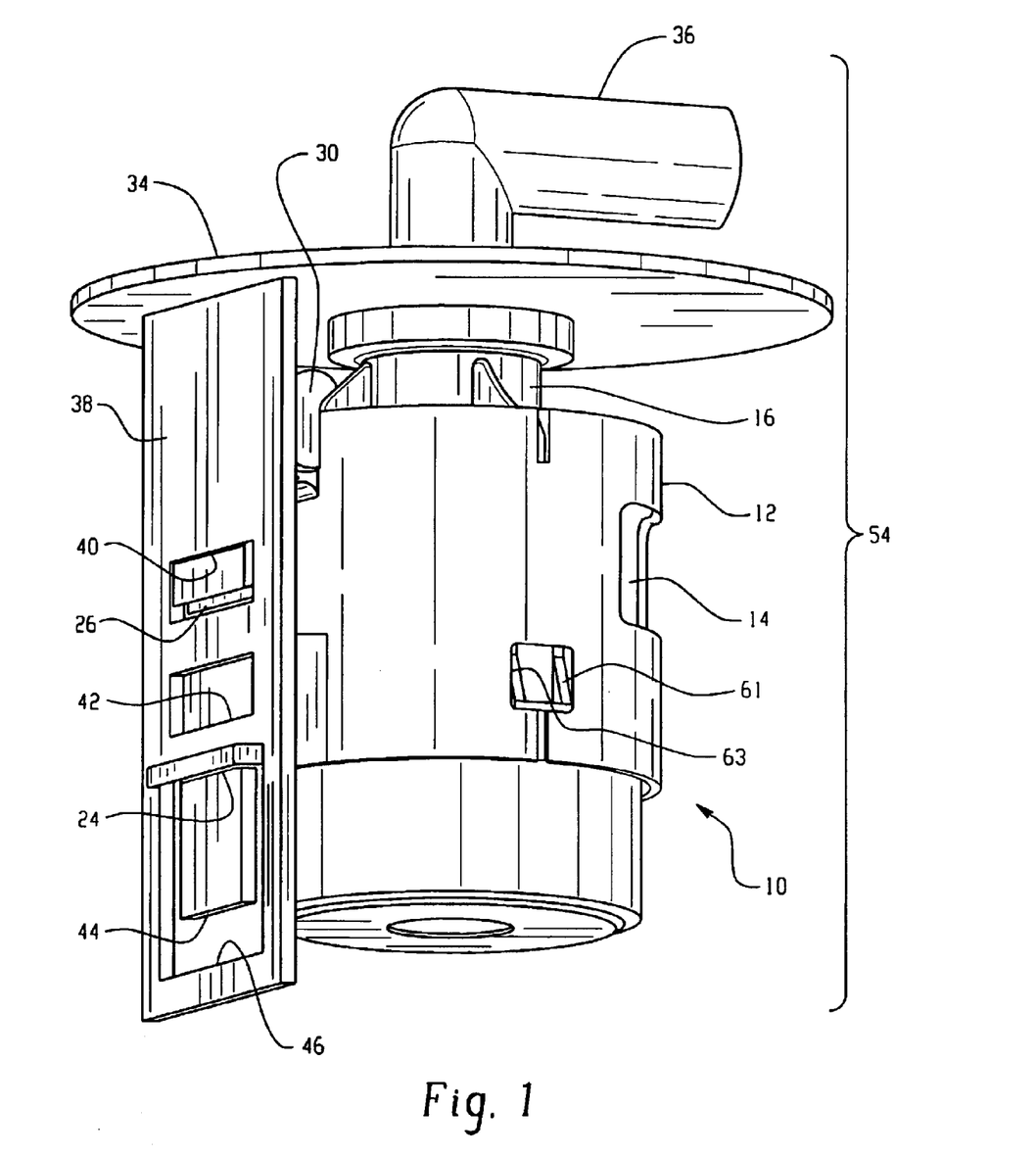
FIG. 1 is a perspective view of a valve assembled to a fuel tank access opening cover for a first selected fuel level vapor shutoff.
Figure 2:
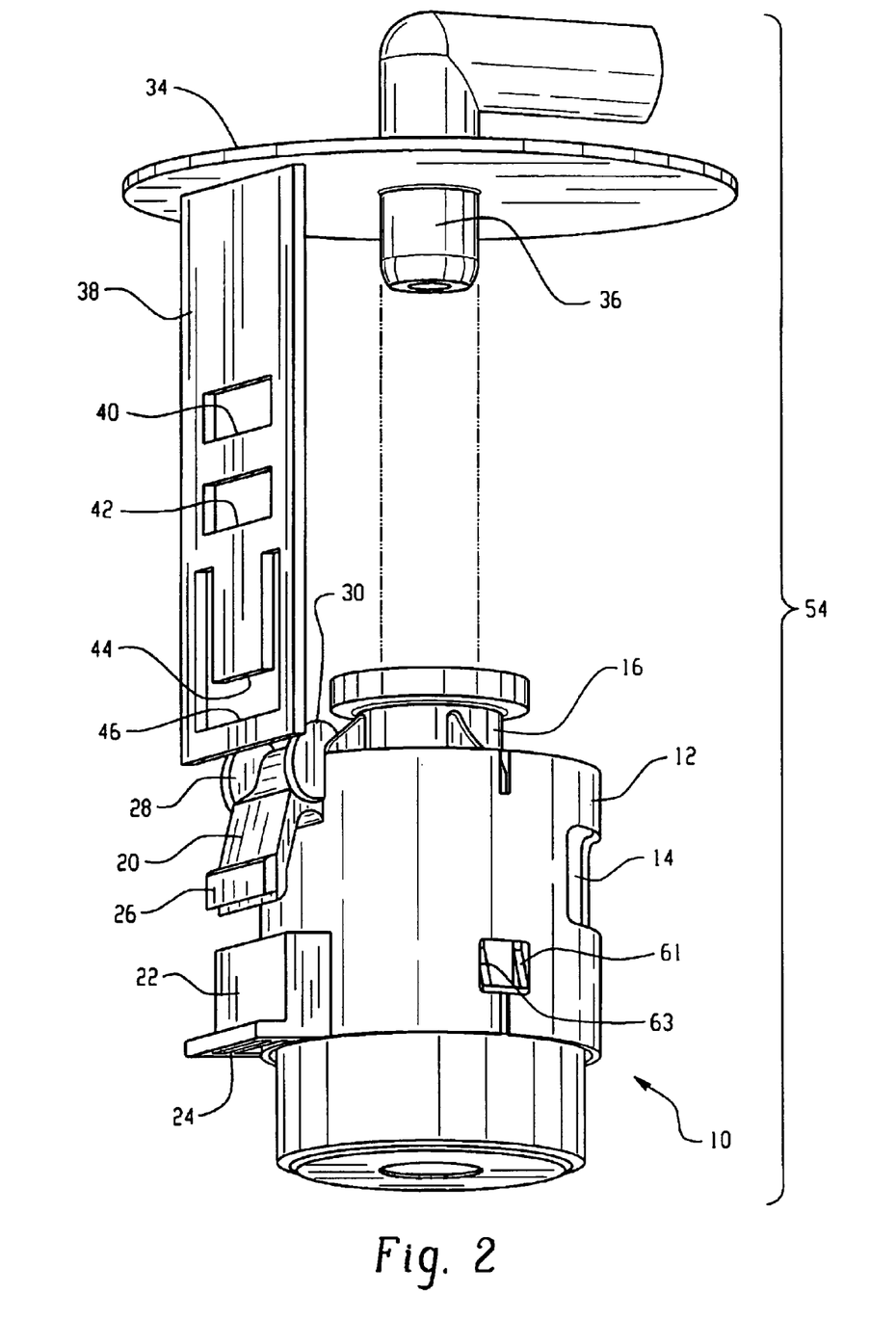
FIG. 2 is an exploded view of the assembly of FIG. 1.
Figure 3:
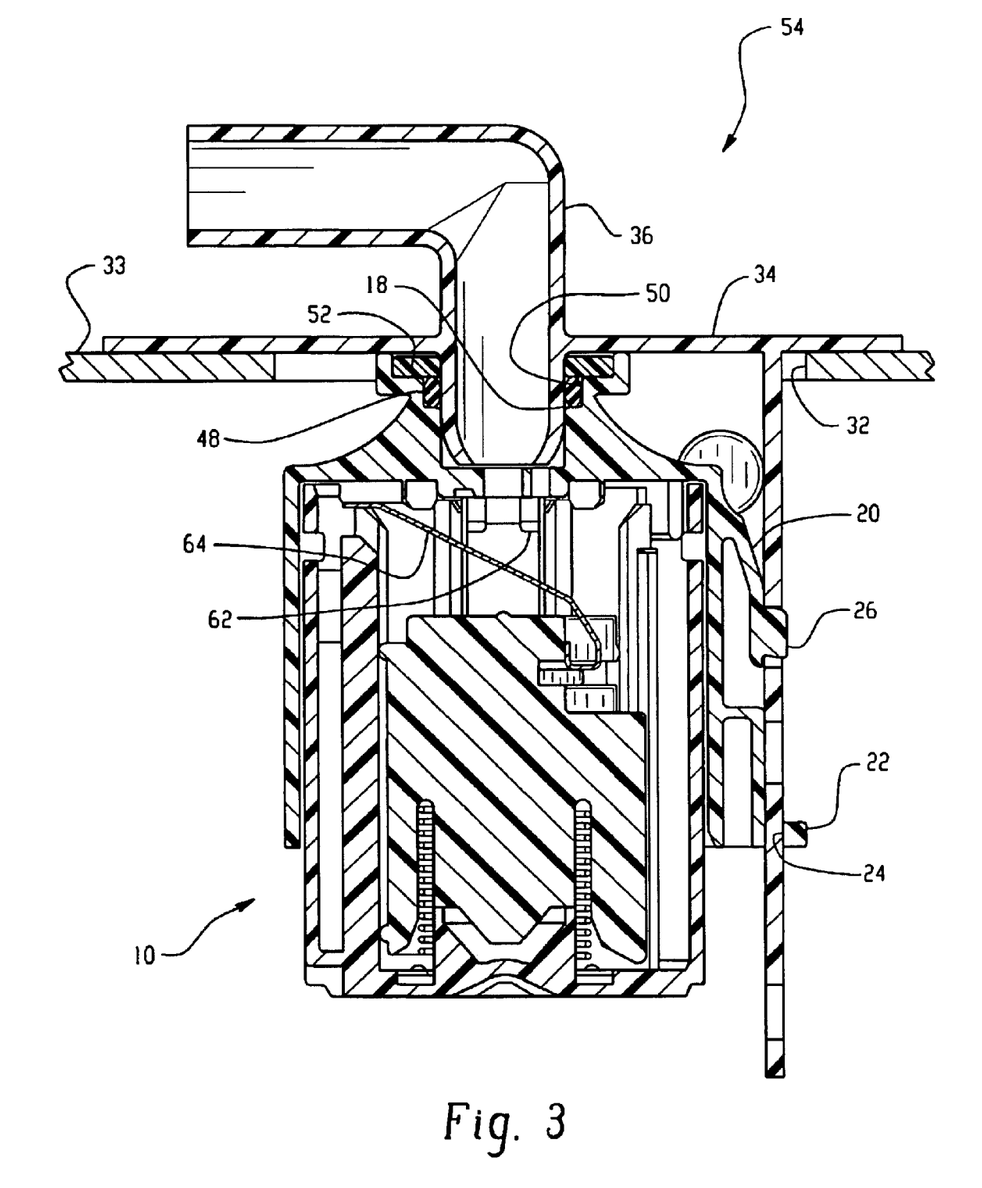
FIG. 3 is a section view of the assembly of FIG. 1 installed through an access opening in the wall of a fuel tank.
Figure 4:
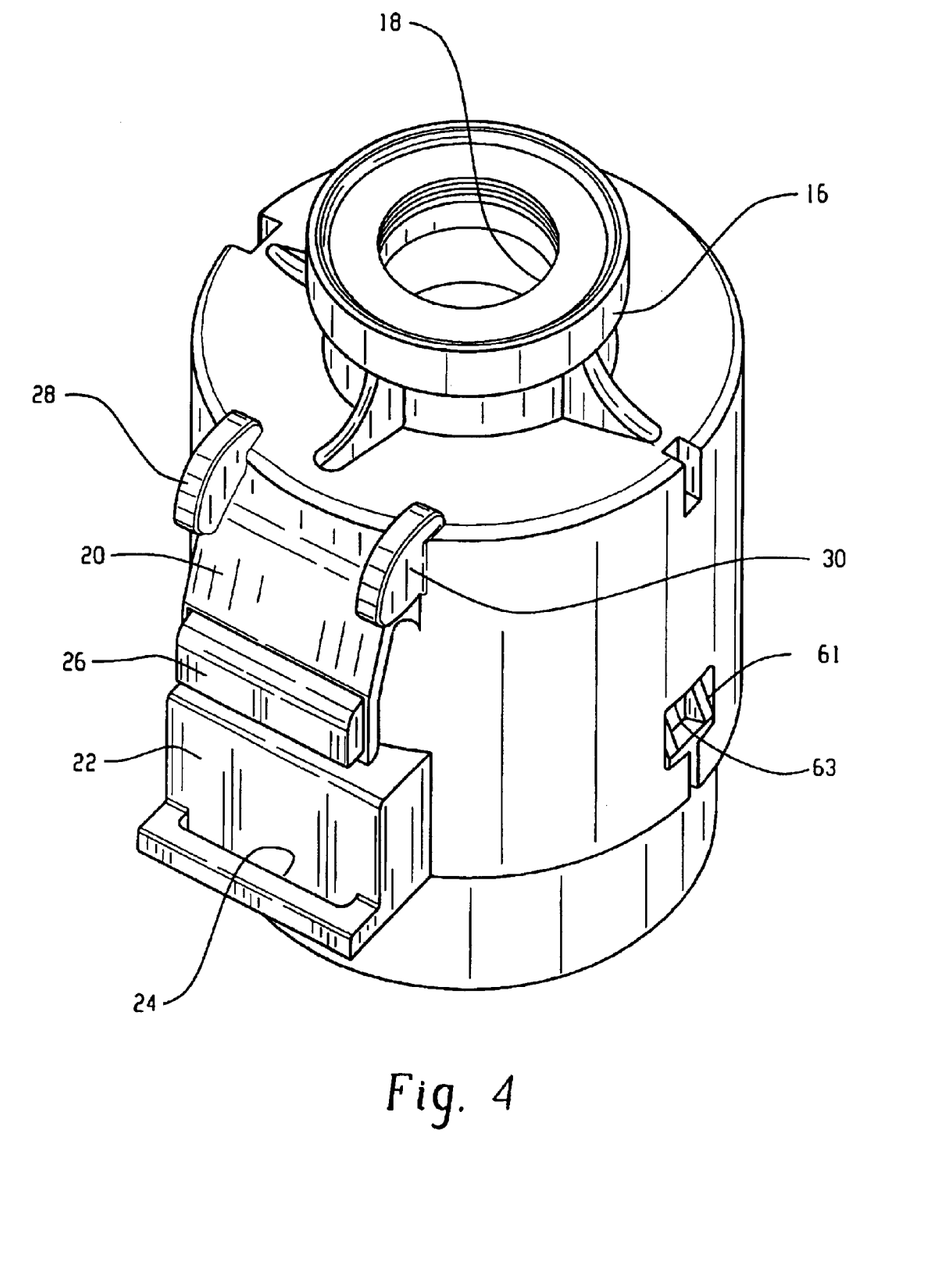
FIG. 4 is a perspective view of the valve of the assembly of FIG. 1 showing the attachment lugs.

Referring to FIGS. 1 through 3, a vapor management valve indicated generally at 10 has a body 12 formed generally of plastic material with at least one inlet aperture 14 and an outlet fitting 16 formed on the upper end thereof with a vapor outlet passage 18 formed therein.

The valve body 12 has a pair of lugs or projections 20, 22 formed on the exterior thereof in generally vertically spaced aligned arrangement with the lower projection 22 having an aperture therein in the form of a rectangular slot 24. The upper projection 20 is in the form of a resilient finger or tab with a lug or tab 26 extending outwardly from the end thereof for snap-locking engagement as will hereinafter be described. In the presently preferred practice, projections 20, 22 are molded integrally into body 12, but may be formed separately and attached thereto.

The valve body further has at least one and preferably a pair of outwardly extending spaced standoffs 28, 30 extending outwardly therefrom and located vertically above the finger 20 in horizontally spaced relationship for facilitating proper location of the valve as will hereinafter be described.

It will be understood that the valve 10 is intended for insertion into a fuel tank through an access opening 32 formed in the upper wall 33 of the tank as illustrated in FIG. 3.

Referring to FIGS. 1 through 5, a cover for the access opening 32 in the tank is denoted by reference numeral 34; and, in the presently preferred practice of the invention comprises a mounting flange associated with a fuel level signal sender (not shown). The cover 34 is attached over the access opening 32 and sealed thereabout by any suitable known expedient, as for example, weldment or mechanical fastening with a suitable seal ring (not shown).

Cover 34 has extending therethrough and downwardly from the undersurface thereof a vapor conduit in the form of fitting 36 which has one end thereof extending downwardly from the undersurface of cover 34 and the opposite end extending outwardly from the exterior surface of the cover.

Cover 34 also has a valve mounting structure 38 located in spaced arrangement with respect to fitting 36 and extending downwardly from the undersurface thereof, which structure comprises, in the presently preferred practice, a bracket having a plurality of spaced apertures 40, 42 formed therein in vertically spaced and aligned arrangement. The bracket 38 also has tab 44 formed therein and positioned below the apertures 40, 42. It will be understood that tab 44 may be formed integrally with the bracket by removing material from the bracket by forming a cutout 46 therein.

Referring to FIGS. 1 and 3, the valve 10 is assembled onto the bracket 38 by engaging slot 24 of lug 22 over the lower end of tab 44 and sliding the valve vertically upward along bracket 38 and snapping the tab 26 on finger 20 into one of the slots 40, 42 on the bracket. The choice of the slot 40, 42 being determined by the desired vertical position of the valve from the upper tank wall 34 depending upon the depth of the tank and the desired location of the valve in the tank for effecting vapor venting shutoff at the desired liquid fuel level. As the valve is slidably moved along tab 44, the portion of fitting 36 depending from cover 34 engages the outlet passage 18 and is sealed therein by a suitable resilient seal ring 48 (see FIG. 3) received in passage 18 and registered against a shoulder 50 formed therein. Ring 48 is retained by a retaining ring 52 which may be press or snap fitted in the end of the fitting 16, or secured by weldment.

The valve 10, cover 34 with bracket 38 and fitting 36 thus comprise a subassembly indicated generally at 54 which is inserted through access opening 32 in the tank wall 33.

Figure 5:
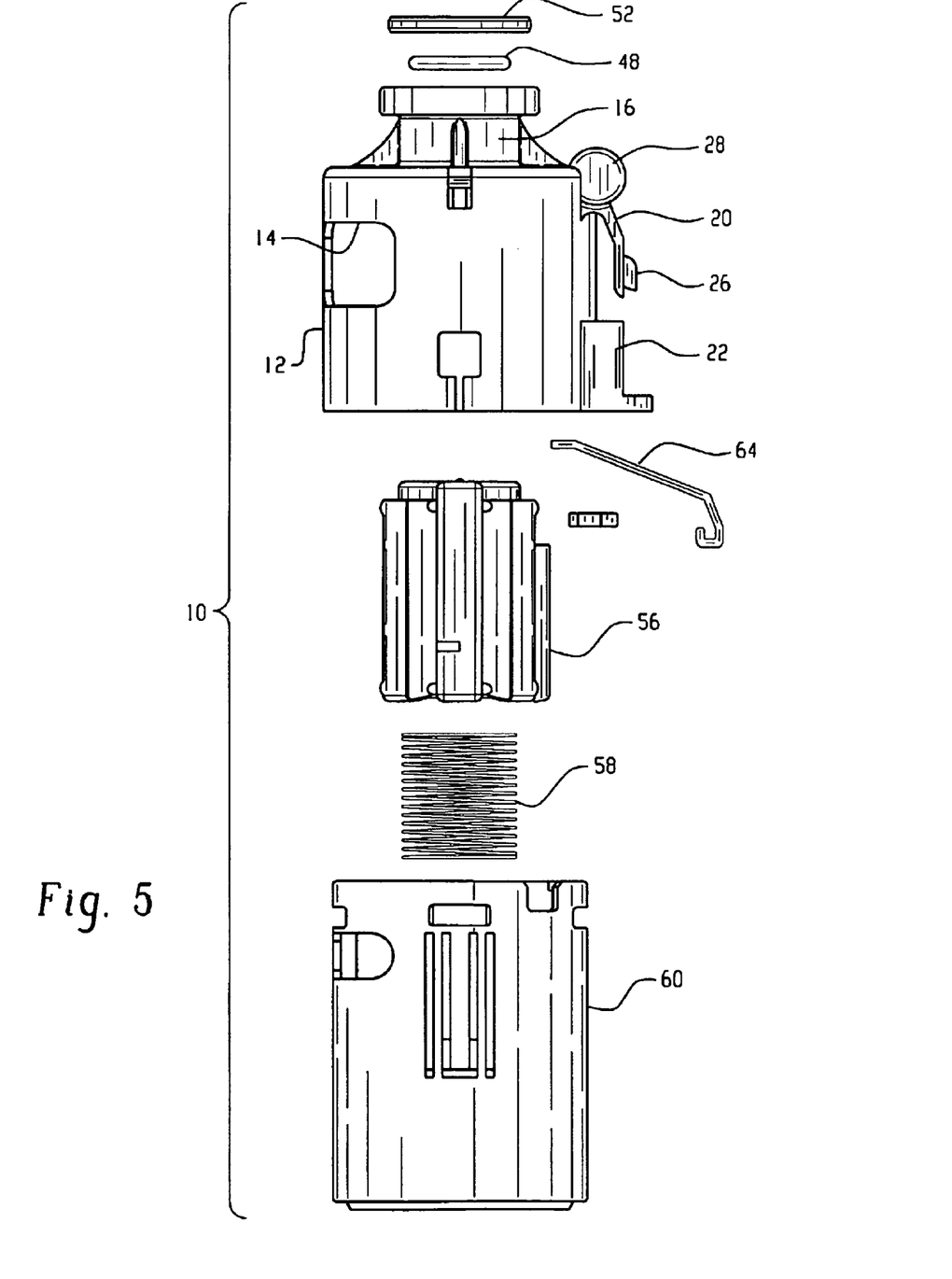
FIG. 5 is an exploded view of the valve of FIG. 4.

Referring to FIGS. 3 and 5, the valve assembly 10 includes a float 56, float spring 58 and float retaining cup 60 which is attached to the valve body 12 by any suitable expedient such as, for example, snap-locking tabs 61 formed on cup 60 engaging slots 63 the body 12 for retaining the float and spring therein.

The outlet passage 18 includes a valve seat 62 and a flexible valve member 64 which closes over the valve seat 62 upon the float rising to the first selected or desired level of fuel within the tank.

It will be understood that upon sliding assembly over tab 44 and snap-locking the tab 26 into the lower slot 42 on the bracket 38, the standoffs 28, 30 slidingly engage the surface of the bracket adjacent the sides of the slots 40, 42 to properly locate the valve inlet passage 18 for engaging the fitting 36.

Referring to FIGS. 6 through 9, another embodiment of the invention is illustrated and includes a vent valve generally at 70 and includes a valve body 72 having a float 74 slidably disposed therein with a calibration spring 76 which float and spring are retained in the body by a cup 78 attached to the body such as by snap-locking tabs 80 formed on body 72 engaging slots 81 formed in cup 78.

The valve body has inlet ports 82 and an outlet fitting 84 extending from the upper end thereof with vent passage or outlet 86 formed therein. Passage 86 communicates with a valve seat 88 formed interiorly of the body 72; and, a flexible valve member 90 is moved by upper movement of the float to close member 90 against the valve seat 88 at a desired level of liquid fuel when the valve is installed in the fuel tank.

The valve body has a plurality of spaced attachment surfaces formed by a projection 92 and a resiliently deflectable finger 94 which has a locking tab 96 extending outwardly from the end thereof. The mounting projection and finger 92, 94 are disposed in vertically spaced aligned relationship; and, the projection 92 has a slot 98 formed therein for vertical engagement therewith.

A pair of standoffs 100, 102 extend outwardly from the body 72 in a radially outwardly extending circumferentially spaced arrangement adjacent to the upper end of the body 72.

Figure 6:
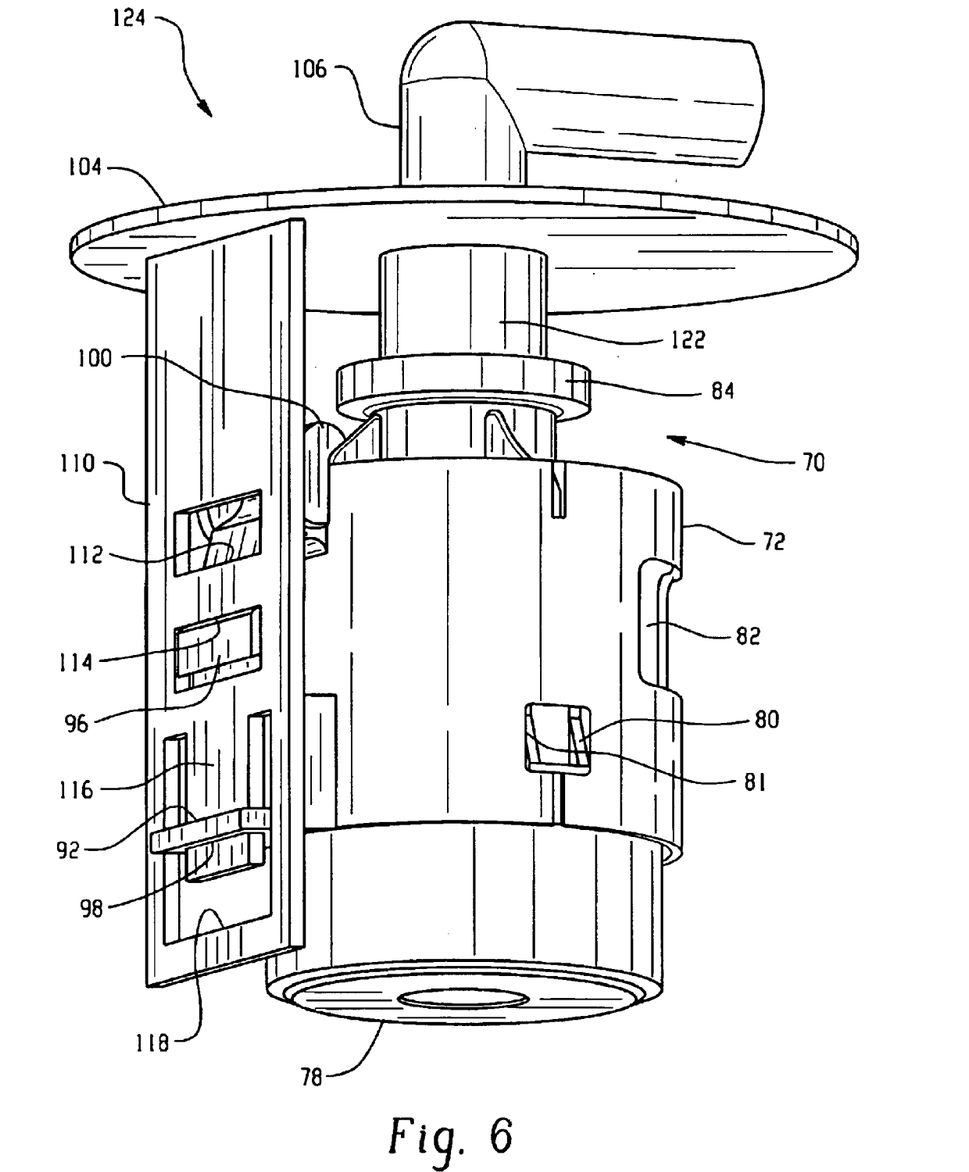
FIG. 6 is a view similar to FIG. 1 of another embodiment for fuel level vapor shutoff.
Figure 7:
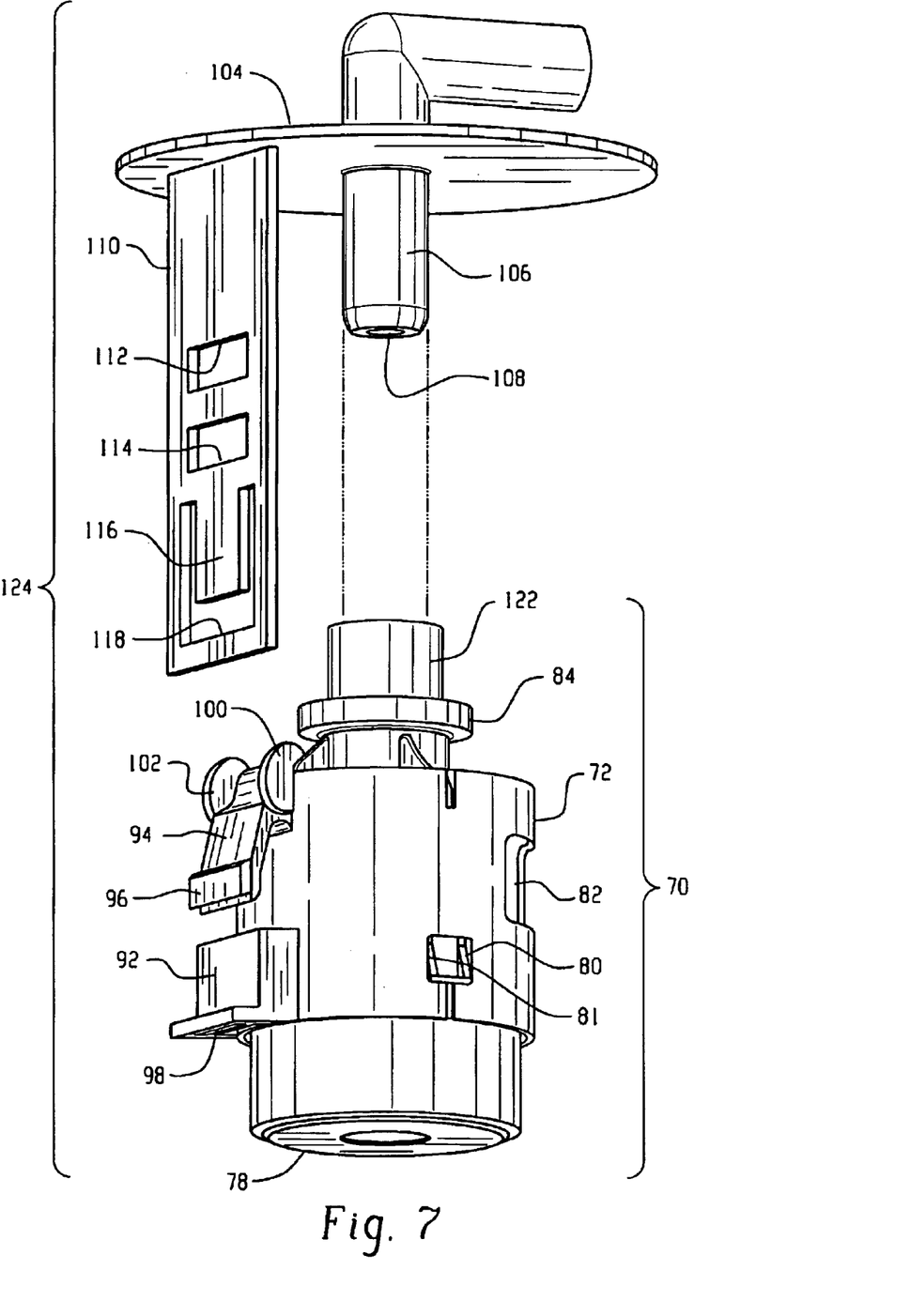
FIG. 7 is an exploded view of the embodiment of FIG. 6.
Figure 8:
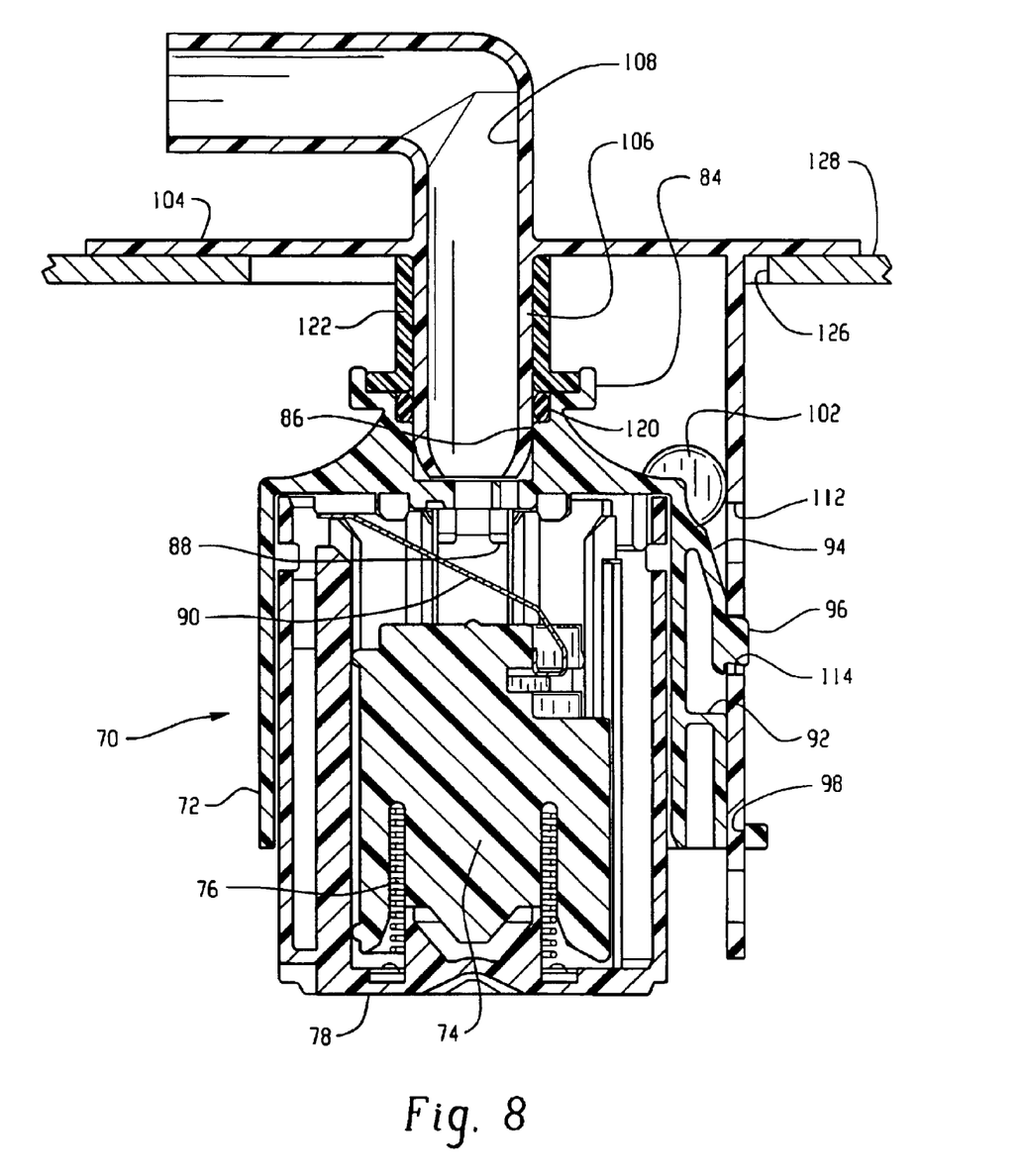
FIG. 8 is a section view of the embodiment of FIG. 6 installed in a tank.

A cover assembly 104 is provided for closing an access opening in the fuel tank through which the valve is to be installed; and, the cover has a fitting 106 provided thereon which extends vertically downward from the undersurface of the cover and exteriorly thereof for connection to a conduit for conducting vapor to a storage device (not shown). The fitting 106 has a continuous vapor vent passage 108 formed therethrough.

The cover 104 has extending downwardly therefrom in generally parallel spaced arrangement with the fitting 106 a mounting structure in the form of a bracket 110 which has a pair of vertically spaced slots or apertures 112, 114 formed therein which are located vertically on the bracket to provide a selection for the desired location of the valve on the bracket.

Bracket 110 further has a vertically downwardly extending tab 116 provided thereon and preferably formed integrally therewith by stamping of a cutout 118 in the bracket.

Figure 9:
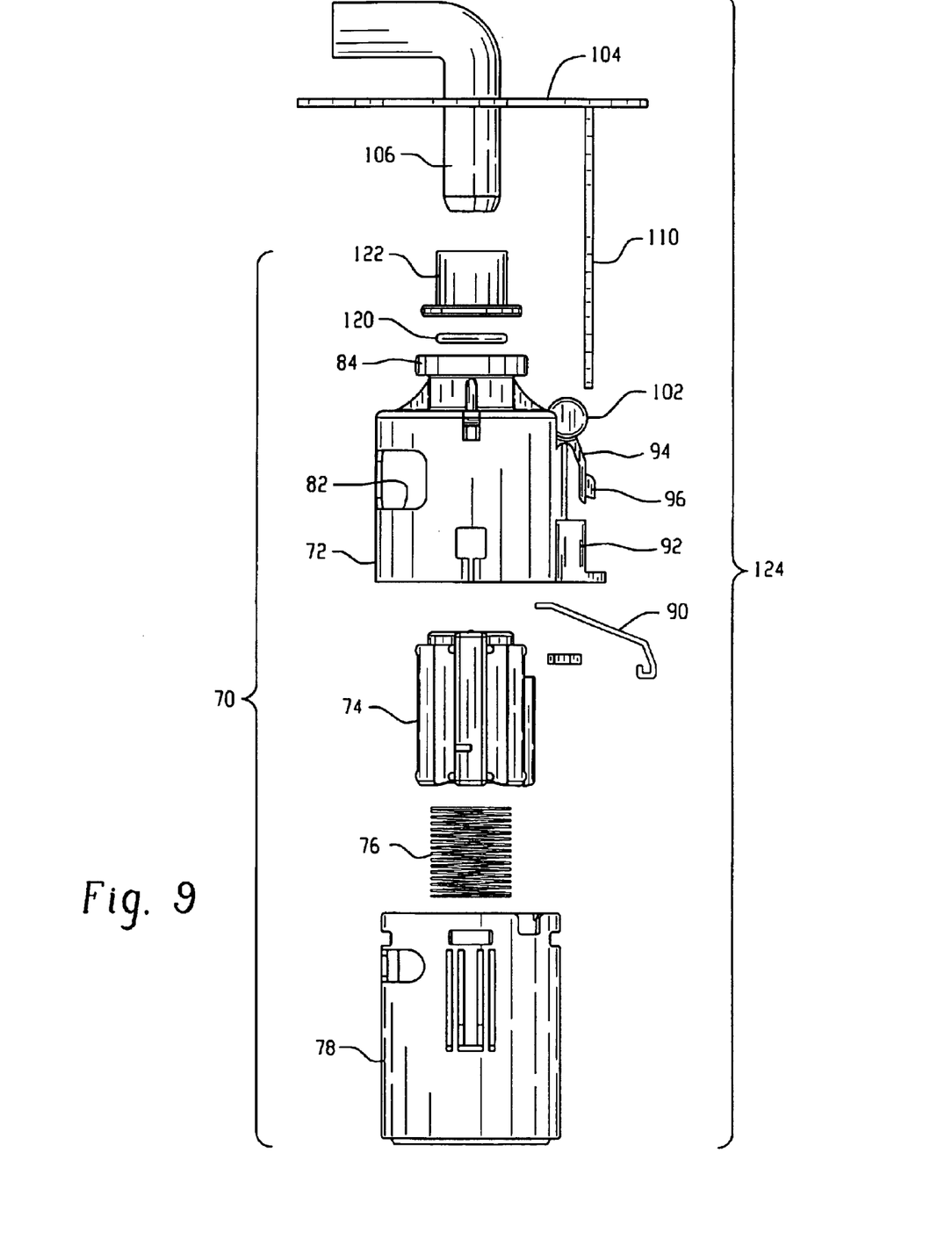
FIG. 9 is an exploded view of the valve of the assembly of FIG. 6.

Valve 70 includes a resilient seal ring 120 disposed in the outlet passage 86, which seal ring is retained therein by spacer 122 which is snap-locked in the outlet neck 84 for retaining the seal ring and retention of the valve as will hereinafter be described.

A subassembly 124 of the valve 70 and cover 104 is formed by slidably engaging the tab 116 on the mounting bracket in slot 98 on projection 92 and snap-locking tab 96 on finger 94 into the lower slot 114 provided on the bracket 110. It will be understood that as the tab 116 is slidably engaged in slot 98, fitting 106 slidably engages the outlet passage 86 and the inner periphery of sealing ring 120 for sealing about the exterior of the fitting 106. The length of spacer 122 is selected such that when the tab 96 engages slot 114, the spacer abuts the undersurface of the cover 104 to facilitate retention of the valve onto the bracket 110.

It will be understood that when the valve is mounted on the bracket 110, the standoffs 102 frictionally engage the surface of the bracket 110 to facilitate locating the outlet port 86 for engaging the fitting 106.

The subassembly 124 is then inserted into an access opening 126 formed in the upper wall 128 of the fuel tank as shown in FIG. 8.

Although the invention has been illustrated as installed through an access opening in the upper tank wall, alternatively the mounting bracket may be attached to the inner surface of the tank prior to assembling the tank from half shells.

The present invention thus provides a unique and relatively low-cost technique for installing a plastic bodied fuel vapor management valve through an access opening provided in the upper wall of a metal fuel tank in a manner which enables selective location of the valve vertically within the tank. The present invention thus provides a single valve design which may be installed in tanks of different depths and yet provides for appropriate location of the valve for vapor vent closure at the desired or selected liquid fuel level within the tank.

The valve may be selectively located vertically on the mounting bracket; and, a single change of spacer retaining ring accommodates the different vertical location to retain the valve on the bracket.

Although the invention has hereinabove been described with respect to the illustrated embodiments, it will be understood that the invention is capable of modification and variation and is limited only by the following claims.

What is claimed is:

1. A method of installing a fuel vapor vent valve through an access opening in a fuel tank comprising:

(a) providing a cover for the access opening with a mounting structure thereon having a plurality of vertically spaced valve mounting surfaces thereon;

(b) forming a valve body with a fuel vapor inlet and outlet and disposing a valve member in said body moveable between a position preventing and a position permitting vapor flow between the inlet and outlet, and forming mounting portions extending exteriorly of the valve body and disposing a resilient annular seal about the outlet; and, (c) selecting a desired vertical position for said valve and engaging said mounting portions with said mounting surfaces corresponding to said selected position and connecting said outlet for communicating vapor from the tank through said cover.

2. The method defined in claim 1, wherein said step of engaging includes snap locking.

3. The method defined in claim 1, wherein said step of forming a mounting portion includes forming a resiliently deflectable member extending from the body.

4. The method defined in claim 1, wherein said step of connecting includes inserting a tubular vent member in said annular seal.

5. The method defined in claim 1, wherein said step of disposing a mounting structure includes disposing a bracket with a plurality of vertically spaced apertures.

6. The method defined in claim 1, wherein said step of providing a cover for said access opening includes forming a mounting bracket thereon.

7. The method defined in claim 1, wherein said step of providing a cover includes providing a fuel level sender flange.

8. The method defined in claim 1, wherein said step of disposing an annular seal about the outlet includes forming an annular shoulder in the outlet, disposing an annular seal in the shoulder and disposing a retaining ring over said annular seal.

9. The method defined in claim 8, wherein said step of disposing a retaining ring includes press-fitting or snap-fitting or otherwise attaching.

10. The method defined in claim 8, wherein said step of disposing a retaining ring includes disposing a spacer.

11. The method defined in claim 10, wherein said step of disposing a spacer includes forming said retainer and spacer integrally as a one-piece member.

12. The method defined in claim 1, wherein said step of connecting said outlet includes providing a tubular fitting on said cover and inserting said fitting in said valve body outlet and sealing about the tubular fitting with said annular seal.

13. The method defined in claim 1, wherein said step of providing a cover includes providing a fuel level sender flange.

14. The method defined in claim 1, wherein said step of engaging said mounting portions with said mounting surfaces includes forming a slot on said valve body and seating a portion of said mounting structure in the slot.

15. The method defined in claim 1, wherein said step of providing mounting portions includes providing a pair of stand-offs on said valve body.

16. The method defined in claim 1, wherein said step of engaging includes vertically adjustably positioning the valve body on said mounting structure.

17. The method defined in claim 1, wherein said step of forming a body includes forming a pair of stand-offs and said step of engaging includes slidably contacting said mounting structure with said stand-offs.

18. The method defined in claim 1, wherein said step of providing mounting portions includes molding the valve body and mounting portions integrally as a one-piece member.

* * * * *